United States Patent [19]

Nemoto et al.

[11] 3,800,635

[45] Apr. 2, 1974

[54] AUTOMATIC LATHE

[75] Inventors: Kenji Nemoto, Tokyo; Akira Saito, Narashino, both of Japan

[73] Assignee: Kabushiki Kaisha Daini Seikosha, Tokyo, Japan

[22] Filed: Dec. 30, 1971

[21] Appl. No.: 214,223

[30] Foreign Application Priority Data
Dec. 30, 1970  Japan............................... 45-127223

[52] U.S. Cl. ................................................ 82/2.5
[51] Int. Cl. ............................................ B23b 13/00
[58] Field of Search ..................................... 82/2.5

[56] References Cited
UNITED STATES PATENTS

| | | | |
|---|---|---|---|
| 2,376,476 | 5/1945 | Chatelain | 82/2.5 R |
| 3,596,545 | 8/1971 | Eisenhardt | 82/2.5 R |
| 3,362,269 | 1/1968 | Bertoglio | 82/2.5 R |
| 3,283,391 | 11/1966 | Thompson et al. | 82/2.5 R |
| 2,374,112 | 4/1945 | Lloyd | 82/2.5 R |
| 2,373,155 | 4/1945 | White | 82/2.5 R |
| 2,343,914 | 3/1944 | Lloyd | 82/2.5 R |
| 3,626,792 | 12/1971 | Eichenhofer | 82/2.5 R X |
| 3,579,686 | 5/1971 | Sorenson | 82/2.5 R X |

FOREIGN PATENTS OR APPLICATIONS

| | | | |
|---|---|---|---|
| 935,874 | 12/1955 | Germany | 82/2.5 R |

*Primary Examiner*—Harrison L. Hinson
*Attorney, Agent, or Firm*—Robert E. Burns; Emmanuel J. Lobato

[57] ABSTRACT

A high speed automatic lathe of the movable spindle head type has a quill spindle comprising a hollow spindle provided with a collet chuck rotatable in a non-rotating but axially movable quill. A tool frame for supporting a plurality of tools is made in one piece with a work spindle frame in which the quill spindle is mounted for axial movement thereby assuring rigidity of construction and accuracy of positioning of the tools relative to the spindle. The spindle is rotated at high speed by a high frequency motor mounted in the work spindle frame in axial alignment with the spindle and provided with an axial bore for passage of a work piece through the motor to the spindle. The quill spindle is movable in an axial direction relative to the motor to provide feeding movement of the work piece while maintaining a direct drive connection between the spindle and the motor. Axial movement of the quill spindle is controlled by a plurality of cooperating cams, thereby simplifying cam layout machine. Cam operated means is also provided for opening and closing the chuck of the spindle while the spindle is rotating at high speeds and without interfering with axial movement of the spindle. The spindle, the cam shaft and a tool attachment having tools for machining the end of a work piece are driven by separate motors thereby avoiding gear boxes and interconnecting shafting.

9 Claims, 6 Drawing Figures

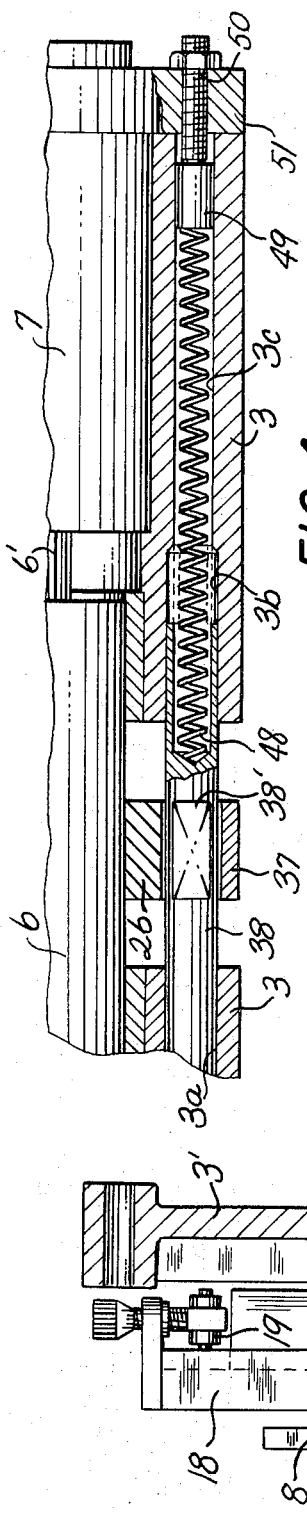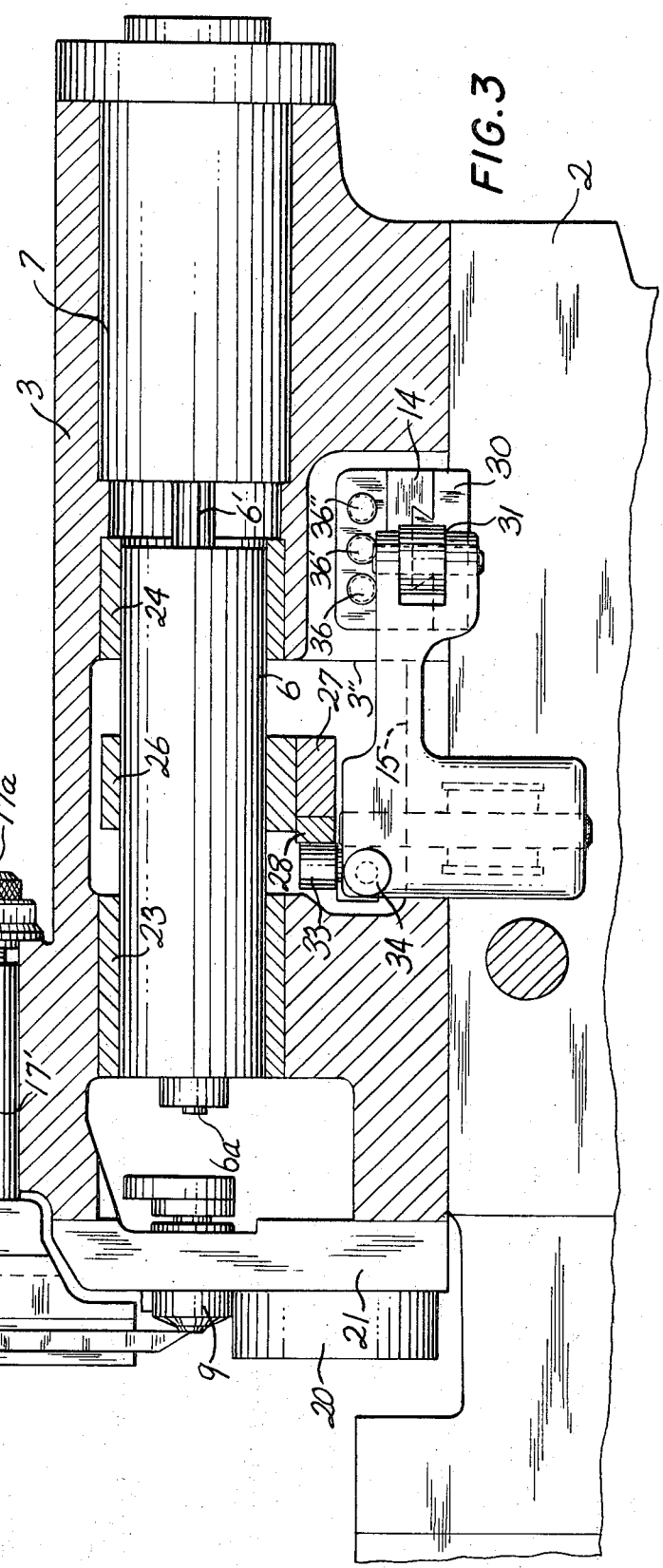

AUTOMATIC LATHE

The present invention relates to automatic lathes and particularly to automatic lathes of the movable spindle head type, sometimes referred to as the Swiss type.

With automatic lathes of the movable work spindle head type, it has heretofore been impossible to obtain reliable stable operation at high speeds. As a matter of fact, it has been virtually impossible to perform precision work at speeds of more than 20,000 r.p.m.

It is accordingly an object of the present invention to provide an automatic lathe which by virtue of its novel construction is capable of machining small diameter articles at high speed and with high precision.

A feature of the present invention is that the work spindle frame and the tool frame are constructed as a single body, thereby greatly increasing the rigidity of the tool-holding frame with relation to the work spindle frame. In previous constructions, a work spindle head which slides on the sliding surface of the bed and a tool frame, which supports a plurality of tools and has a guide bushing for axially supporting the work, are mounted on the bed individually. Since the supporting surface of the tool frame is necessarily limited and is small compared with the height of the tool frame, the rigidity is reduced and vibration at high speeds is unavoidable. These defects are avoided by the integral construction of the work spindle frame and the tool frame in accordance with the present invention. Moreover, with the integral construction of the work spindle frame and the tool frame, in accordance with the invention, it is possible to obtain much greater accuracy in the relative position of the work spindle to the tools and the guide bushing may be retained in accurate alignment with the spindle because the machining accuracy of a single part is superior to the machining of several parts which must thereafter be assembled.

A further feature of the invention is that instead of the work spindle head being slidable on the machine bed, as in conventional lathe construction, the work spindle is of quill construction and is slidable in the work spindle frame. Moreover, the work spindle is directly connected with a coaxial or high frequency motor housed in the same work spindle frame, thereby making it possible to attain high speed rotation of the work spindle and high speed sliding of the quill while at the same time affording facility of replacement and interchangeability of the components. Moreover, in accordance with the invention, the weight of the sliding part is much smaller than that of the conventional type and the rotating part is reduced in diameter thereby avoiding abnormal centrifugal force and unbalance due to the high speed of sliding and rotation and avoiding the occurrence of vibration. Moreover, in the event repair or maintenance is required, the down time of the lathe in accordance with the present invention is considerably less than in the case of the lathe of the conventional type.

A further object of the invention is to provide novel mechanism for opening and closing the work holding chuck of the spindle so that the chuck can be opened and closed easily and effectively even when the spindle is rotating at high speed.

Still another feature of the invention is that the spindle; a cam shaft controlling axial sliding movement of the spindle, opening and closing of the chuck and operation of vertical tools, and an attachment having various tools for machining the front end surface of the work piece are driven by individual motors respectively so that the conventional intermediate shafting and gear box are eliminated, thereby eliminating a source of vibration.

The nature and objects of the invention will be more fully understood from the following description of a preferred embodiment illustrated by way of example in the drawings, in which:

FIG. 3 is a partial longitudinal section taken on the axis of the spindle;

FIG. 4 is a partial longitudinal section of a spindle feeding guide;

Figure 1:
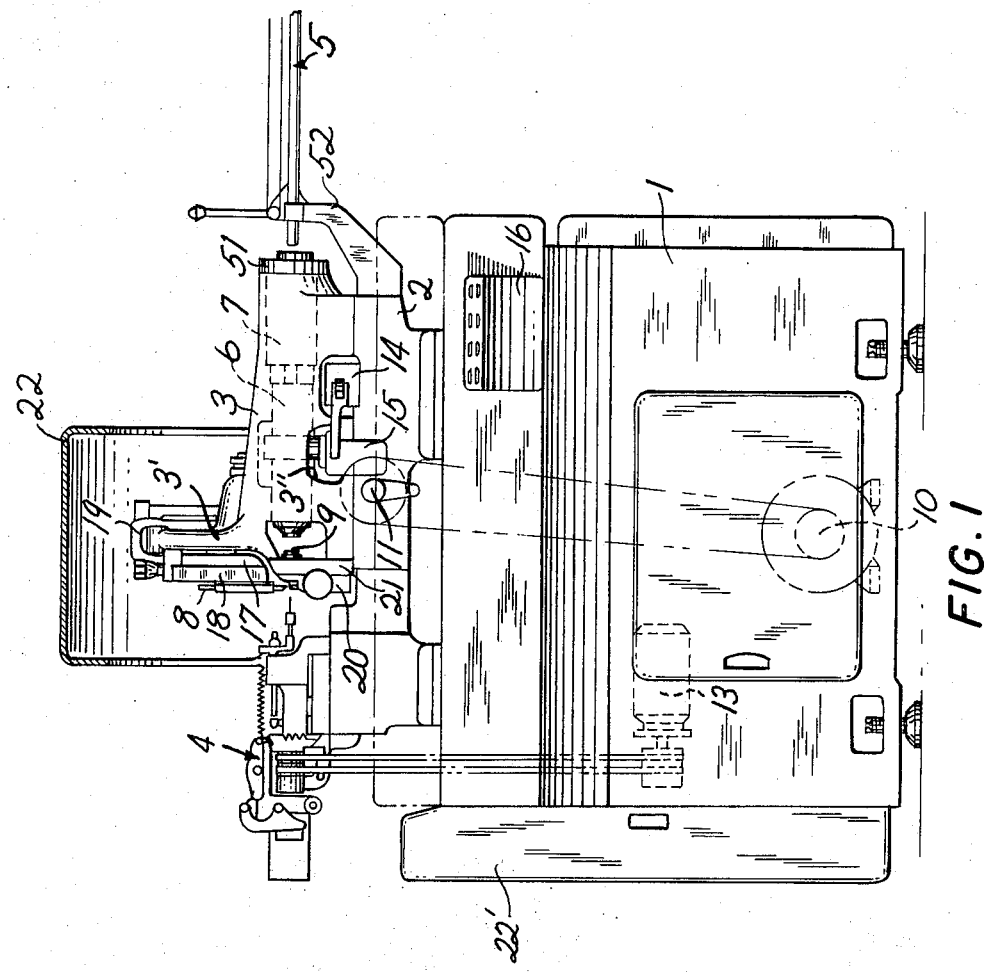
FIG. 1 is a front view of an automatic lathe in accordance with the present invention.

In the automatic lathe illustrated by way of example in the drawings, a machine bed 2 is mounted on the upper surface of a base 1. On the righthand portion of the bed 2, as viewed in FIG. 1, there is mounted a work spindle frame 3 housing a quill type spindle 6 and a high frequency motor 7 in axial alignment with the spindle. Moreover, the frame 3 includes an integral tool frame portion 3' which extends upwardly and supports a tool holder 18 that holds a plurality of vertical tools 8 selectively engageable with the work piece in front of the spindle and slidably mounted on a vertical slide 17, having a rearwardly projecting shank portion 17' which is received in a bore in the tool frame portion 3' and secured by means of a nut 17a secured on to a threaded end portion of the shank 17'. The one-piece construction of the work spindle frame 3 and the tool frame 3' provides rigidity which reduces vibration and assures accurate positioning of the tool frame with respect to the spindle frame.

At the righthand side of the lathe, as viewed in FIG. 1, a bracket 52 mounted on the machine bed 2 supports a material supply device 5 that supplies bar stock to be machined to the working position through aligned axial bores of the motor 7 and quill type spindle 6. On the lefthand end of the one-piece frame 3. there is securely mounted a guide bushing holder 21 in which a guide bushing 9 for the work piece is rotatably mounted. A rocking arm 20 pivotally mounted on the frame 3 below the guide bushing holder 21 carries oppositely facing horizontal tools. This arrangement is well known in automatic lathes. At attachment 4, having various tools for machining the front end surface of the work material, is mounted on the upper surface of the lefthand portion of the bed 2, as viewed in FIG. 1. At the back of the bed 2, there is rotatably supported a cam shaft 12 extending parallel to the spindle axis and carrying cams for swinging the rocking arm 20 and imparting feed movement to the vertical tools 8 mounted on the tool holder 18. The cam shaft 12 also carries cams 35, 35' and 35" for moving the quill spindle 6 axially and cams 46 and 47 for opening and closing the workholding chuck of the spindle, as will be described below. The cam shaft 12 is driven through a driving shaft 11 by a cam driving motor 10 installed in the base 1 of the lathe. The attachment 4 is driven by a separate motor 13 likewise installed in the base 1. In other words, the spindle, the cam shaft and the attachment are driven individually by separate electric motors. The motors 7, 10 and 13, as well as other operating parts of the lathe, are controlled by a control box 16 mounted on the front of the base 1. The work zone of the lathe, including the front end of the spindle 6 and the tools engageable with the work piece, is enclosed by a cover 22 while a cover 22' is provided for the lefthand end of the lathe, as viewed in FIG. 1. A further cover 51 provided for the righthand end of the spindle frame 3 is provided with an opening through which the work material is fed to the lathe by the supply device 5.

Figure 2:
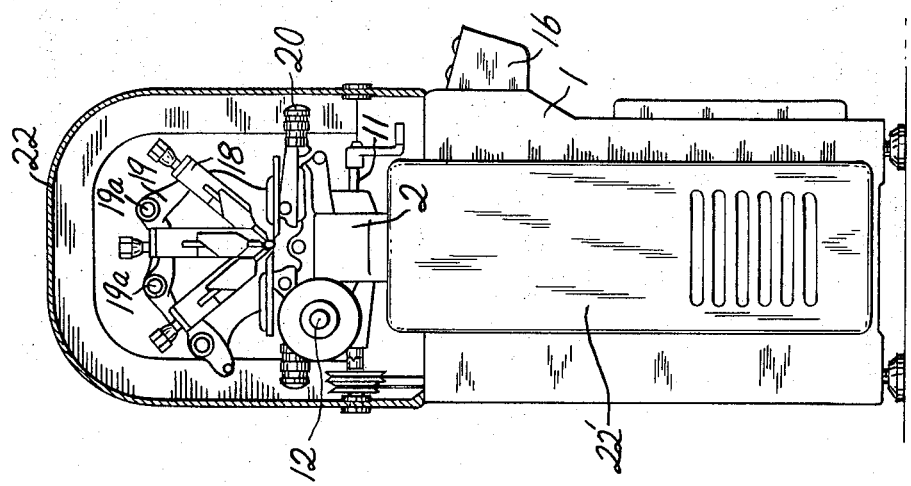
FIG. 2 is an end view of the lefthand end of the lathe as viewed in FIG. 1.

Now that the general construction of the lathe, as illustrated in FIGS. 1 and 2, has been described, the spindle head and associated parts of the lathe will be described in more detail with reference additionally to FIGS. 3 to 6. The quill spindle 6 is of the kind shown in copending application Ser. No. 210,900, filed Dec. 22, 1971, corresponding to Japanese Application No. 118920/45 (1970), filed Dec. 26, 1970, and comprises a hollow spindle rotatably mounted by means of ball bearings in a tubular casing 6q called a "quill". At one end, the spindle is provided with a splined shaft portion 6' for connection to the high frequency motor 7, while at the opposite end the spindle is provided with a workholding collet chuck 6a for holding the work piece. As disclosed in the aforesaid application, the quill spindle is provided with means including an actuating sleeve 39 for opening and closing the chuck.

Figure 5:
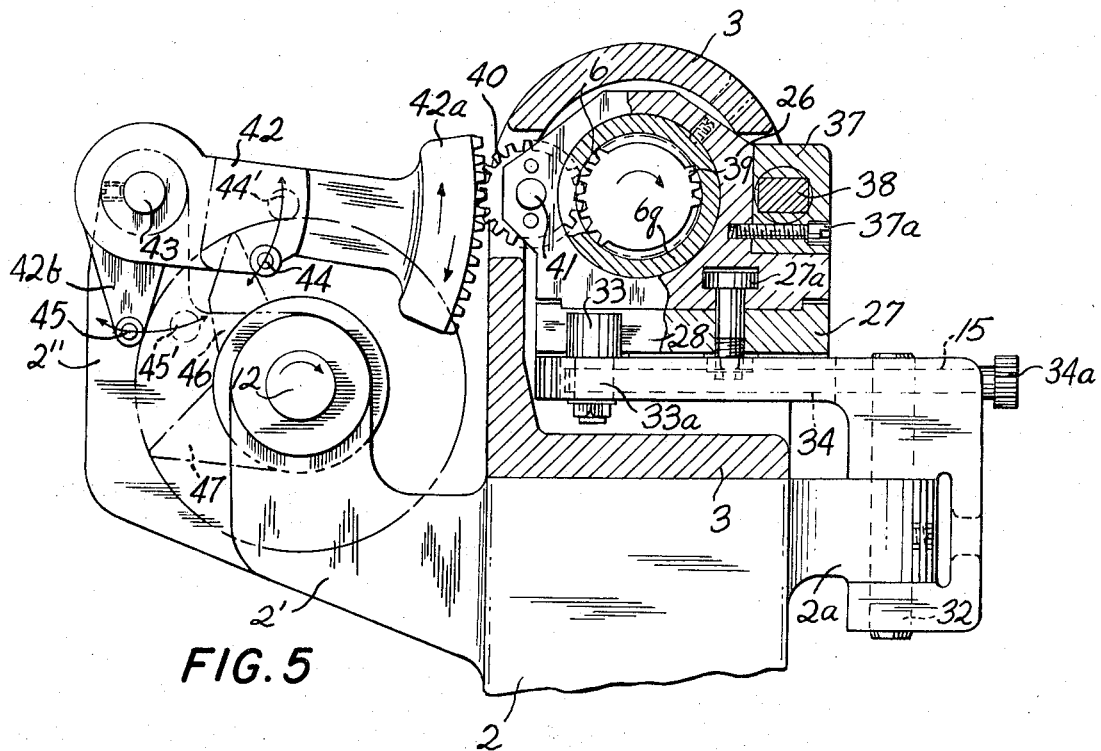
FIG. 5 is a partial cross section showing a chuck opening and closing lever and a spindle feeding device.

The quill spindle 6 is slidably supported in the frame 3 for axial movement by means of bearing bushings 23 and 24, disposed respectively at front and rear portions of the spindle (FIG. 3). Between the bushings 23 and 24, the spindle frame 3 is provided with a window opening 3'' formed in the center of the front side of the frame. This window provides access for connecting to the quill spindle 6 means for moving the spindle axially in the bearing bushings 23 and 24. Although the high frequency motor 7 is mounted in fixed position in the frame 3, axial movement of the quill spindle 6 is permitted by the splined connection 6' while maintaining a direct driving connection between the motor and rotating spindle. At the central portion of the window opening 3'', a block 26 is secured by set screws on the outer periphery of the quill 6q. An adjusting plate 27 is secured on the under surface of the block 26, for example by a pin 27a, and is provided on its lefthand surface as viewed in FIG. 3 with an abutment plate 28. (FIGS. 3 and 5).

Figure 6:
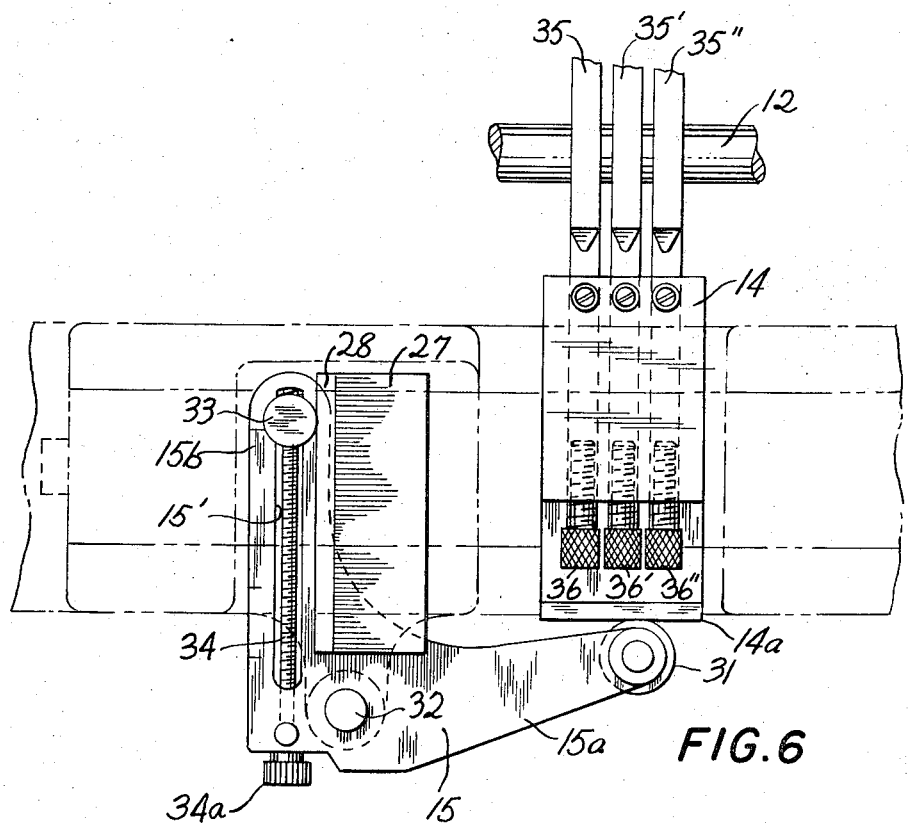
FIG. 6 is a partial plan view showing the spindle feeding mechanism.

Means for axially moving the quill spindle 6 further comprises cams 35, 35' and 35'' on the cam shaft 12 (FIG. 6). When bar material is being machined by a combination of various machining steps, for example screw cutting, taper shaping, cutting off, etc., the combination of the amount and speed of the feeding movement becomes quite complicated with the result that a single cam satisfying all of the requirements would be complex and difficult to machine. This difficulty is avoided by providing a plurality of cams each performing one or more separate movements of the quill spindle as required by the work to be performed. While three cams have been shown by way of example in the drawings, it will be understood that the number of cams is variable and can be selected according to the complexity of the work. Moreover, the cams are mounted on the cam shaft 12 in such manner as to be interchangeable so that different cams can be used for different jobs. The cams 35, 35', 35'' are engageable respectively by cam followers 36, 36', 36'' adjustably mounted on a holder 14 that extends underneath the quill spindle 6 and is slidable on a guide plate 30 in a direction perpendicular to the axis of the cam shaft 12 (FIGS. 3 and 6). At its forward end the cam follower holder 14 is provided with a bearing plate 14a which is engageable by a roller 31 on one arm 15a of a Radiax lever 15 which is pivoted on both ends of a pin 32 extending through a hole in a forward projecting portion 2a on the front side of the bed 2. The Radiax lever 15 is formed as a bell crank with a second arm 15b perpendicular to the arm 15a. A roller 33 on the arm 15b is engageable with the abutment plate 28 of the block 26 secured to the quill 6q of the quill spindle. The roller 33 is mounted on the arm 15b in such manner that its distance from the pivot pin 32 can be selectively varied. For this purpose the roller 33 is rotatably mounted on a follower 33a which is slidable in a longitudinal slot 15' in the arm 15b of the bell crank lever 15 and engages a screw shaft 34 which is rotatably supported in the arm 15b and can be turned by means of a projecting knob 34a. According, by rotating the screw shaft 34, the roller 33 is shifted along the longitudinal groove 15' and the lever ratio of the lever 15 is accordingly adjusted. By reference to FIG. 6 it will be seen that if the holder 14 is moved forwardly by engagement of one of the cams 35, 35', 35'' with one of the cam followers 36, 36', 36'', the lever 15 will be turned in a clockwise direction by engagement of the holder 14 with the roller 31 and the quill spindle 6 will be moved toward the right by engagement of the roller 33 on the lever arm 15b with the abutment plate 28, the amount of movement depending on the amount of movement of the holder 14 by a cam and on the lever ratio of the lever 15 as determined by the selected position of the roller 33 along the lever arm 15b.

Means is provided for holding the spindle quill 6q against rotation and for biasing it in a direction toward the left as viewed in FIG. 6 so as to maintain the abutment plate 28 in engagement with the roller 33 on the lever 15. As seen in FIGS. 4 and 5 the front portion of the block 26 is provided with an L-shaped recess to receive a central portion 38' of a guide bar 38 which extends parallel to the quill spindle axis. The central portion 38' of the guide bar is of rectangular cross section and is secured to the block 26 by a holder 37 held by one or more screws 37a. The guide bar 38 has opposite end portions of round cross section slidably received in guide holes 3a and 3b bored in corresponding positions in the frame 3. An axial hole is bored in the right hand end portion of the bar 38, as viewed in FIG. 4, to receive one end of a compression spring 48 the opposite end of which is received in a linear extension 3c of the hole 3b in frame 3. The spring 48 is held under compression between the bar 38 and a spring seat 49 positioned by an adjusting screw 50 which extends through the cover 51 and closes the righthand end of the bore 3c as viewed in FIG. 4. The bar 38 serves as a guide for the axial sliding movement of the quill spindle 6 as well as a stop to prevent the turning of the quill 6q. The spring 48, acting through the guide bar 38, exerts a force on the quill spindle 6 so as to tend to move it axially toward the left, as viewed in FIGS. 3, 4 and 6, and thereby press the abutment plate 28 against the roller 33 of the lever 15, thus tending to swing the lever in a counterclockwise direction, as viewed in FIG. 6, to move the holder 14 rearwardly and thereby bias the cam followers 36, 36', 36'' toward the cams 35, 35' and 35''. Thus the cams 35, 35' and 35'' act through the followers 36, 36', 36'', holder 14 and Radiax lever 15 to move the quill spindle 6 toward the right, as viewed in FIG. 6, while the spring 48 acting through the guide bar 38 tends to move the quill spindle toward the left.

As indicated above, means is provided for opening and closing the collet chuck 6a, located at the forward end of the spindle rotatably supported in the quill 6q without stopping the high speed rotation of the spindle, whereby the work material is chucked or unchucked as required. As stated above, the quill spindle is of the construction shown and described in copending patent application, Ser. No. 210,900, and includes a chuck-actuating sleeve 39 having a screw thread engaging a corresponding screw thread provided on the inner periphery of the quill 6q so that rotation of the chuck actuating sleeve 39 results in its being moved axially of the quill 6q. A sliding sleeve rotatably supported in the chuck-actuating sleeve 39 and movably axially with it is engageable with balls which extend through openings in the spindle and are engageable in turn with an axially movable chuck operating sleeve inside the spindle. When the chuck-actuating sleeve 39 is rotated in a direction to screw it toward the chuck end of the spindle, the sliding sleeve moving axially with the chuck-actuating sleeve 39 presses inwardly on the balls to retract the chuck operating sleeve against spring bias and thereby open the chuck. Conversely, rotation of the chuck-actuating sleeve 39 in the opposite direction results in closing of the chuck. This operation will be clear from the copending application.

The chuck-actuating sleeve 39 is rotatable by means of elongated gear teeth which are provided on its outer periphery and intermesh with a gear 40 which is rotatably supported on a pin 41 secured on a projecting portion of the frame 3 and extending through openings in the frame 3 and the spindle quill 6q (FIG. 5). The gear wheel 40 further meshes with a sector gear 42a on the forward end of a lever 42 which is pivotally supported by a pin 43, secured at the end of a rearwardly projecting bracket portion 2'' on the bed 2. The lever 42 is located above the cam shaft 12, supported at the end of a bracket portion 2', similarly projecting rearwardly from the bed 2. A chuck opening cam 46 on the cam shaft 12 is engageable with a follower roller 44 on the lever 42 to move the lever and hence the sector gear 42a in a counterclockwise direction and thereby rotate the gear 40 in a clockwise direction and the chuck actuating sleeve 39 in a counterclockwise direction to open the chuck. A closing cam 47 on the cam shaft 12 is engageable with a follower roller 45 on a right angle arm 42b of the lever 42 to move the lever and hence the sector gear 42a in a clockwise direction and thereby rotate the gear 40 in a counterclockwise direction and the chuck-actuating sleeve 39 in a clockwise direction to close the chuck. The cams 46 and 47 are angularly positioned on the cam shaft 12 so as to provide proper timing of the opening and closing of the chuck. In FIG. 5, the positions of the cam followers 44 and 45, shown in full lines, indicate the closed state of the chuck and the positions 44' and 45' of the followers, shown in dot-dash lines, indicate the open state of the chuck. Thus, as the actuating sleeve 39 is made to rotate by the rotation of the cam shaft 12 acting through the cams 46, 47, lever 42, sector gear 42a and gear wheel 40, it is possible to open and close the chuck at definite times and positions without stopping the rotation of the spindle. The length of the gear teeth of the chuck-actuating sleeve 39 and gear 40 is sufficient that the teeth do not disengage even though the quill 6q performs a feeding or working movement in an axial direction.

The cam shaft 12 also carries suitable cams acting through cam followers and levers 19 to impart feeding movement to the vertical tools 8 carried by the tool holder 18. Since the tool holder 18 is mounted on an integral portion 3' of the unitary frame 3 in which the quill spindle is supported and guided, precise correlation of the tools and a work piece carried by the spindle is assured. Moreover, the levers 19 are pivotally supported by pins 19a mounted in holes provided in the portion 3' of the frame 3.

With the construction described above, the high rigidity provided by the one-piece construction of the work spindle frame and tool frame eliminates structural weakness, assures greater accuracy in the relation of the parts and minimizes vibration. The utilization of a quill type spindle capable of opening and closing the chuck and moving axially without stopping the high speed rotation of the spindle makes it possible to obtain high speed rotation of the spindle as well as a high speed feed stroke of the quill. Moreover, by driving the spindle, the cam shaft and the end-working tool attachment by means of separate motors, gear boxes and intermediate shafting liable to cause vibration are avoided and construction of the lathe is simplified. The features in accordance with the present invention thus provide an automatic lathe capable of operating at high speed with high efficiency and producing work of high quality.

While the invention has been described by reference to a preferred embodiment shown by way of example in the drawings, it will be understood that it is in no way limited to the details of construction of the illustrated embodiment.

What we claim and desire to secure by Letters Patent is:

1. In an automatic lathe, the combination of a bed, a frame mounted on said bed and comprising a work spindle frame having a longitudinal horizontal bore and an integral tool holding frame projecting upwardly at one end of said work spindle frame, a quill spindle assembly comprising a tubular quill non-rotatable and axially movable in said bore of said work spindle frame, a hollow spindle rotatable in said quill and movable axially therewith and a chuck on said spindle for holding work to be turned, means mounted on said tool holding frame for holding tools to engage said work, means for rotating said spindle, operating means for moving said quill axially while said quill is rotating, and operating means for opening and closing said chuck while said quill is rotating, said operating means including a cam shaft rotatably supported by said frame, cams on said shaft and cam followers operatively connected with said means for moving the spindle axially and said means for opening and closing said chuck.

2. A combination according to claim 1, in which said cams include a plurality of coaxial cams jointly controlling axial movement of said quill and said spindle and cam followers engageable respectively by said cams.

3. A combination according to claim 2, in which said means for moving said quill and quill spindle axially includes a bell crank lever pivotally mounted on said bed, said lever having one arm actuatable by said cam followers and a second arm operatively connected with said quill.

4. A combination according to claim 3, comprising a guide rod extending parallel to the axis of said quill spindle and connected with said quill and spring means associated with said guide rod to bias said quill to move axially in one direction.

5. A combination according to claim 3, comprising means for varying the lever ratio of said bell crank lever.

6. A combination according to claim 1, in which said means for opening and closing said chuck comprises a rotatable actuating sleeve in said quill, said actuating sleeve having gear teeth on its periphery, a gear sector mounted for oscillatory movement on said bed, means interconnecting said gear sector and said gear teeth of said actuating sleeve and cams on said cam shaft for imparting oscillatory movement to said gear sector to rotate said actuating sleeve and means interconnecting said actuating sleeve with said chuck to open said chuck when said actuating sleeve is rotated in one direction and to close said chuck when said actuating sleeve is rotated in the opposite direction.

7. A combination according to claim 1, in which means for driving the spindle comprises a high frequency motor stationarily mounted on said work spindle frame, and means interconnecting said spindle with said motor for permitting movement of said spindle axially relative to the motor while transmitting rotary motion from the motor to the spindle, said motor having an axial passage through which the work passes.

8. A combination according to claim 1, further comprising operating means including a cam on said cam shaft and cam follower means for imparting feeding movement to said tools mounted on said tool holding frame in timed relation to axial movement of said quill.

9. A combination according to claim 1, further comprising a work guiding bushing rotatably mounted in said integral frame in axial alignment with said spindle.

* * * * *